United States Patent [19]

Jokinen et al.

[11] Patent Number: 5,729,534
[45] Date of Patent: Mar. 17, 1998

[54] DYNAMIC ALLOCATION OF RADIO CAPACITY IN A TDMA SYSTEM

[75] Inventors: Harri Jokinen, Hiisi; Jari Hamalainen, Tampere; Harri Posti, Oulu, all of Finland

[73] Assignee: Nokia Mobile Phones Limited, Finland

[21] Appl. No.: 582,915

[22] Filed: Jan. 4, 1996

[30] Foreign Application Priority Data

Jan. 9, 1995 [FI] Finland ................................. 950097

[51] Int. Cl.$^6$ ................................. H04B 7/212
[52] U.S. Cl. .................... 370/280; 370/337; 370/348; 370/349; 370/352
[58] Field of Search ................... 370/232, 252, 370/253, 280, 337, 345, 347, 348, 349, 352, 458, 468, 477, 498; 379/58, 59, 60; 455/33.1, 33.2, 34.1, 54.1, 54.2, 56.1

[56] References Cited

U.S. PATENT DOCUMENTS

| 4,698,802 | 10/1987 | Goke et al. ............................. 370/352 |
| 4,887,265 | 12/1989 | Felix ..................................... 370/349 |
| 5,396,539 | 3/1995 | Slekys et al. .......................... 379/59 |
| 5,513,183 | 4/1996 | Kay et al. ............................. 370/337 |
| 5,528,664 | 6/1996 | Slekys et al. ......................... 370/352 |
| 5,533,019 | 7/1996 | Jayapalan ............................. 370/352 |

FOREIGN PATENT DOCUMENTS

| 0168927 A3 | 1/1986 | European Pat. Off. . |
| 0212031 | 3/1987 | European Pat. Off. . |
| 0214352 | 3/1987 | European Pat. Off. . |
| 0250160 A2 | 12/1987 | European Pat. Off. . |

Primary Examiner—Alpus H. Hsu
Attorney, Agent, or Firm—Perman & Green, LLP

[57] ABSTRACT

The invention relates to a method aiming at dynamic division of the radio capacity in a TDMA system dynamically between packet radio service and circuit switched service. According to the invention, some basic number of time slots are reserved for packet radio service and the rest are reserved for circuit switched service. When the traffic requirement of packet radio service increases, information regarding this is obtained by means of a request from a mobile station or through traffic measurement at the base transceiver station. This information is used as a criterion in allocating more time slots to packet radio service.

20 Claims, 1 Drawing Sheet

DYNAMIC ALLOCATION OF RADIO CAPACITY IN A TDMA SYSTEM

FIELD OF THE INVENTION

The present invention relates to a method by which radio capacity is divided dynamically between packet radio service and circuit switched service in a TDMA system in which two-way traffic between base stations and mobile stations takes place in time slots on predetermined channels. The invention also relates to a mobile system operating according to the method.

BACKGROUND OF THE INVENTION

Most present-day cellular networks offer circuit switched services for speech and data. The available frequency band is divided between these services, all having equal priority. The network does not take into account whether the capacity is used for the transmission of speech or data.

Considering burst-form data services, circuit switching does not exploit the channel optimally. Therefore packet radio services are used alongside existing circuit switched services in cellular networks. Since the existing radio band cannot be expanded, packet radio services must be fitted into the same band as circuit switched services. Thus a certain amount of capacity has to be taken from circuit switched services for packet radio services.

In TDMA cellular systems, a radio band is usually divided into multiple frequency bands (FDMA, Frequency Division Multiple Access), and each frequency band is further divided into multiple time slots. Logical channels are transmitted in the physical time slots of the radio interface. In circuit switched cellular systems, all time slots are used for control signaling and for circuit switched traffic.

Cases associated with this topic have been discussed previously in certain patent publications. One example of them is EP-26 11 27, which describes a time-sharing telecommunications system wherein the spectrum is exploited in a relatively efficient manner by dividing narrow-band radio frequency channels into at least two time slots, one to transmit coded speech signals and one to provide two-way transmission. However, this publication does not discuss the dynamic allocation of capacity, and it does not discuss packet radio services as such.

U.S. patent No. 4,887,265 discloses a packet radio switched cellular system. In this system, a plurality of data calls can be switched to one and the same radio channel, whereby radio spectrum is saved. However, the publication mainly discusses the criteria of handoff. It does not discuss the dynamic allocation of capacity to packet radio and circuit switched services.

SUMMARY OF THE INVENTION

The purpose of the invention is to indicate a method by which the capacity of a radio channel can be better exploited. The object is a method which is used in determining the number of time slots allocated, on the one hand, to packet radio service and, on the other hand, to circuit switched service. According to the invention, this is done by using the characteristics of Claim 1 by allocating dynamically more capacity, i.e. more time slots, to the form of service requiring it at a given time.

According to the present invention, some basic number of time slots are reserved for packet radio service and a number of time slots for circuit switched service. If, for example, the traffic need of packet radio service increases, information regarding this is obtained through a request flagged by a mobile station or through traffic measurement by the base station, whereupon this information is used as a criterion in the allocation of more time slots to this service. Such a request can be transmitted from a mobile station to a base station on a message or signaling channel (e.g. in call set-up signaling) or on a traffic channel, or it may be, for example, a short message output. The request may also be transmitted on a packet radio channel. The capacity required by each service is monitored in the base station system (BSS), which is in a known manner made up of base transceiver stations (BTS) and base station controllers (BSC), and from which information is transmitted to the mobile station regarding the channel configurations, i.e. the allocation of radio capacity (which channel is in the use of which service).

In the basic mode, all the time slots of the channel may be allocated to packet radio service when circuit switched service does not need capacity. In this case, one or several time slots are allocated to circuit switched service when a request for it is received, for example, from a mobile station in call set-up signaling. The base station controller (BSC) interprets the request from call set-up signaling and thereupon deallocates a channel which is in the use of packet radio service and allocates it to circuit switched service. Alternatively, a predetermined minimum number of time slots may be allocated in the basic mode to packet radio service, in which case more time slots will be allocated to packet radio traffic when it increases. When the number of time slots used for packet radio service is increased, the same number of time slots must be deallocated from circuit switched service in the same channel.

In a preferred embodiment of the invention, a certain minimum number of time slots are allocated in the basic mode to packet radio service, this minimum number being controlled on the basis of economic factors important for the traffic and/or the operator. The control can be coupled to the results of traffic measurement at the base transceiver station so that the control will be automatic. Alternatively, the operator may effect the control manually, and it may be based on historical information on traffic, etc.

In sparsely populated areas, or when the packet radio traffic of a TDMA cell is known to be very scanty or incidental, all of the time slots of the channel serving this cell may be allocated to circuit switched service. When an incidental need for packet radio traffic arises, information regarding this is transmitted to the base transceiver station, for example via the message channel of circuit switched service or via some other signaling channel, traffic channel or short-message output. For the purpose, also a specific message may be defined which the mobile station requesting the service will transmit to the base transceiver station. Preferably, however, existing messages are used for the request, for example a part of a call set-up message minimally modified, in which case also old services will function.

According to a preferred embodiment, more time slots for a service may be allocated in the same frequency band so that the maximum number of time slots allocated to the service will be equal to the number of time slots in the band. Alternatively, time slots may be additionally allocated to a service also in another channel.

The object is thus a method which is used in determining the number of time slots in use, on the one hand, for packet radio service and, on the other hand, for circuit switched service. The same mechanism can be used in parallel for FDMA bands and, on the other hand, also for only one frequency band. In downlink packet radio control channels, the radio channels allocated to packet switched use must be flagged very often in order to keep the mobile stations informed of the channels currently in force.

BRIEF DESCRIPTION OF THE DRAWINGS

The invention is described in greater detail with the help of the following examples, with reference to the accompanying figures wherein.

DETAILED DESCRIPTION OF THE INVENTION

Figure 1:
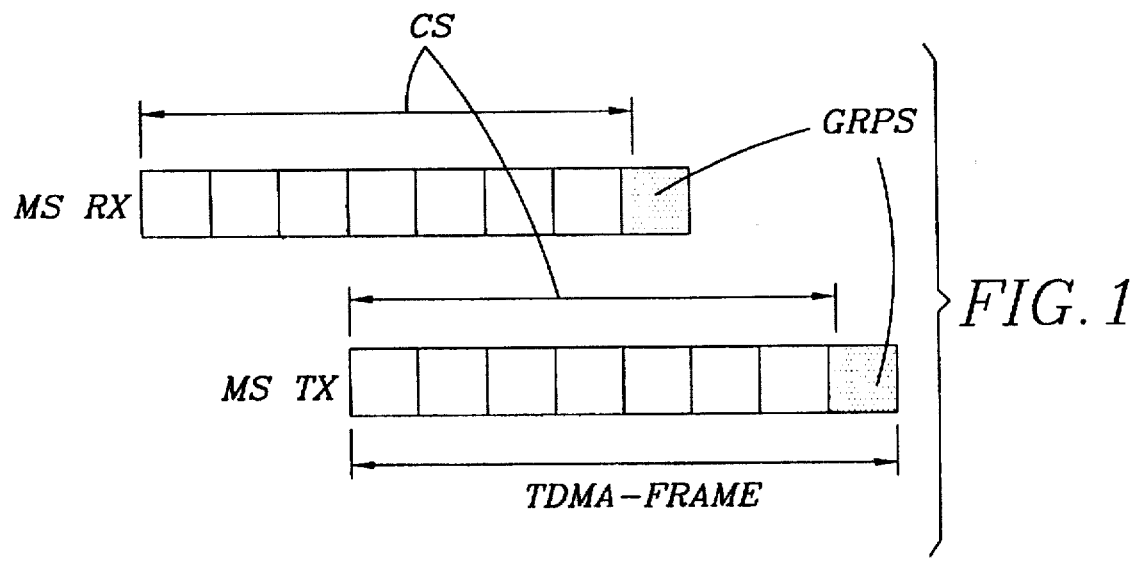
FIG. 1 shows time slots in a TDMA frame.

In packet radio cellular systems, such as the GPRS system (General Packet Radio Service) standardizable for GSM/DCS 1800 systems, some of the channels must be allocated to packet radio traffic. In this case the easiest method is that one time slot or multiple time slots is/are allocated permanently to packet radio traffic, and the rest of the time slots are reserved for circuit switched services. However, it is possible to divide the capacity even more flexibly between circuit switched service and packet radio service. The TDMA frame of one carrier wave of the GSM/DCS 1800 system is illustrated in FIG. 1. The upper row shows the TDMA frame MS RX received by a mobile station and the lower row the transmission frame MS TX, offset with respect to time. The figure shows how one time slot in both downlink direction and uplink direction is reserved for packet radio service GPRS. The rest of the time slots are reserved for circuit switched (CS) calls.

Packet radio service in TDMA systems is quite new as compared with methods dividing a common frequency band, such as Aloha-based protocol. In TDMA radio systems using packet transmission, usually a plurality of users share one carrier wave time slot (frequency band) in both uplink and downlink directions. As in GSM/DCS 1800 systems, one time slot out of eight time slots of 200 kHz radio carrier wave could be allocated to the GRPS channel. About 25 kbit/s could be transferred in this selected time slot.

The capacity of one time slot may be insufficient. In this case the operator could allocate also another time slot, and even all time slots of a 200 kHz radio carrier wave, to packet radio service.

When multiple time slots are available, their use can be either combined or separate. In combined use, the time slots of the same carrier wave form for transmission a capacity pool shared by the mobile stations. One of the same mobile station may use multiple time slots in order to achieve a higher data rate for packet transmission. In separate use, each time slot is a separate physical packet transmission channel, and such channels are allocated to the mobile stations in a cell so as to achieve an even distribution of traffic. The distribution may be controlled, for example, in the same manner as mobile stations in a GSM system are divided into separate paging groups.

In both cases, in time slot sharing and in separate use, increasing packet radio traffic in the cell may be served better by allocating, when need increases, more item slots to packet radio service.

Figure 2:
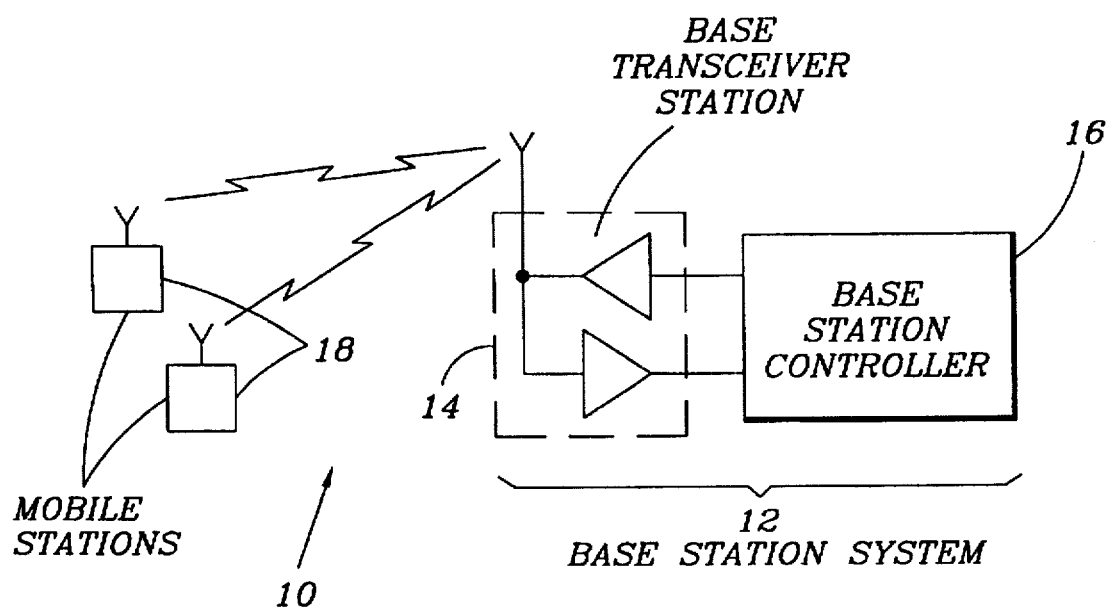
FIG. 2 is a block diagram of a TDMA mobile communication system in accordance with this invention.

FIG. 2 is a block diagram of a time division multiple access (TDMA) mobile system 10 which comprises a base station system (BSS) 12 comprising at least one base transceiver station (BTS) 14 and base station controller (BSC) 16, as well as mobile stations 18. Two-way traffic between the base transceiver stations 14 and mobile stations 18 takes place in time slots on predetermined channels, and in which mobile system there is a packet radio service and a circuit switched service. In accordance with this invention, there is provided a dynamic division of radio capacity between packet radio service and circuit switched service.

In a basic mode the base station system (BSS) 12 reserves for packet radio service a predetermined first number of time slots and for circuit switched service a predetermined second number of time slots. The base station system 12 monitors the capacity required for each service, and allocates to packet radio service and/or circuit switched service, on the basis of a predetermined criterion, one or more additional free time slot/slots, while deallocating a corresponding number of time slots from the other service. The base station system 12 also transmits to a mobile station 18 information regarding the division of radio capacity between packet radio service and circuit switched service.

EXAMPLE 1

A situation is examined in which circuit switched connections are not in use. In this case, all time slots are allocated to packet radio service. The timing requirements of a packet radio channel are very strict. When a mobile station 18 transmits a request for the transmission of a packet, the base station system 12 must reserve a time slot for this mobile station within a few hundreds of milliseconds, or even faster. For this reason there must always be channel capacity available for packet radio service.

In a cellular network, calls are set up much more slowly. Normally a call is set up within about 3–5 seconds. When the base transceiver station 14 detects signaling required for the setting up of a mobile-originated or mobile-terminated circuit switched call, one of the packet radio channels can be reserved for such a circuit switched call. Normally, the maximum transmission time within one and the same reservation in packet radio service is limited. It is a reasonable assumption that the transmission time is below 1 second. If there is transmission on all of the packet radio channels, or on only one of them, the transmission of the packet is completed before the same channel needs to be allocated to circuit switched use. However, a number of time slots must be reserved for packet radio service, these time slots being always available for this service so that a certain minimum level of service can be guaranteed in the cell. This may be a parameter adjustable at the base transceiver station. The operator may adjust this parameter on the basis of the amount of traffic and economic calculations. When a circuit switched call has been completed, the channel is again released for packet radio service.

By means of this algorithm, rapid packet transmission can be accomplished without disturbing circuit switched traffic. The capacity for circuit switched traffic may be increased when the number of time slots reserved for packet radio service exceeds the minimum capacity indicated by the parameter.

The adjustment of the above-mentioned parameter could, of course, also be automated, for example on the basis of the traffic requirement measured by the base transceiver station, as described below.

In a normal operating mode, all the channels on one carrier wave (in GSM, eight time slots or channels in one burst) are reserved for packet radio services (GPRS). The signaling channels may be on a separate carrier wave or in certain allocated time slots, and the logical channels on the GPRS carrier waves. Mobile stations use the conventional signaling of the mobile telephone system for call set-up. From call set-up signaling the base station system (BSS) 12 detects that a call is arriving in the cell. The base transceiver station detects this after a mobile station 18 has transmitted to it a Channel Request, which is signaled by the base transceiver station (BTS) 14 to the base station controller (BSC) 16 in a Channel Required message. The base station controller 16 of the base station system 12 checks whether there are free traffic channels, whereupon a channel in the use of packet radio service is released for circuit switched calls as follows. If a free traffic channel is found, the mobile station 18 is given a free channel as soon as it needs a channel. If a free channel is not found, reallocation of the packet radio channel is initiated and the channel is allocated to circuit switched use immediately when needed.

The base station system 12 needs a channel before it transmits an Assignment Request to the mobile station 18. The system will have ample time to reallocate the channel before the transmission of the Assignment Request. Within the time between the Assignment Request and the Channel Required message, signaling takes place on the signaling channel, in which case the channel in the use of packet radio service can be used until the Channel Required message is transmitted. After the channel has been taken into the use of circuit switched service and after the circuit switched call is completed, the channel is free and is reallocated to packet radio service.

The base station system 12 keeps the mobile station 18 informed of the division of radio capacity, i.e. transmits to the mobile station information as to which channels are in the use of which service (i.e. it transmits information regarding so-called channel configurations).

The checking of capacity and the channel deallocation, according to the invention, between packet radio and circuit switched services may be especially necessary in the case of handover, i.e. when a mobile station moves from one cell to another cell, where, for example, all channels are in the use of packet radio service. In this case the capacity checking and channel reallocation, described above, are preferably carried out after the base station system 12 has received from the mobile station 18 a Handover Request and before the base station system 12 transmits to the mobile station 18 a Handover Request Acknowledgement. In other respects the handover procedure is defined in the specifications of the mobile system and is therefore known to an expert in the art and is not described here in greater detail.

EXAMPLE 2

The following situation is examined as another alternative. A certain minimum service level is required in a cell. For example, one time slot could always be reserved for packet radio service. The other time slots are used for circuit switched services, or they are free. The base transceiver stations 14 measure the quantity of traffic transmitted on the packet radio channel. Of course, the channel allocation behavior in a cell must be examined carefully before application, for example on the basis of traffic measurements of the cell concerned or on the basis of history data obtained from corresponding cells elsewhere. In the utilization of a channel there is a certain percentage limit, and at a utilization ratio higher than this the channel becomes overloaded and the service level weakens. If the utilization ratio of a channel reaches this value, another time slot must be reserved for traffic. This can be applied to even eight time slots within one GSM carrier wave and even to multiple carrier waves.

When the utilization ratio of a channel decreases and reaches another, lower, level, one of the time slots in packet radio use can be deallocated.

The algorithm according to this second alternative gives a higher priority to packet radio service, and circuit switched services can use the capacity not required by packet radio services.

The determination of the threshold values may be based on long-term follow-up of traffic. Alternatively it may be variable in such a manner that by using the measuring results obtained within a specified past time period the threshold values are updated regularly.

EXAMPLE 3

The following case is discussed as one further alternative. A certain service level, which may be quite low, is always offered in a cell. A mobile station 18 may make a request to the channel control block for a few time slots, one or several. On the basis of this request the base transceiver station 14 allocates more time slots to packet radio service. One channel must, of course, be allocated very rapidly to the mobile station 18. In this case additional channels cannot be reserved immediately. The mobile station 18 is given the basic channel. During the Assignment Request concerning the subsequent packet the network has had enough time to allocate multiple channels to packet radio service. Thus the mobile station 18 may gain access to the additional capacity it requested initially, i.e. multiple time slots for transmission.

EXAMPLE 4

One further alternative is discussed below. In a rural area the allocation of even one time slot, or part of a time slot, for packet radio service may be excessive if, for example, in the area there is only one mobile station, which transmits data once a week. In this case no basic capacity for packet radio service needs to be reserved in the cell.

When the mobile station 18 needs to transmit packet data, it transmits a message to that effect of the network. Since now no free packet radio channels are available, the message may be transmitted on conventional signaling channels which are used for circuit switched services. The message may also be transmitted on other signaling channels, traffic channels or as a short-message output.

EXAMPLE 5

The above examples 1 and 2 can be used in combination so as to ensure that both circuit switched services and packet radio services share the channel capacity in a "fair" manner. This means that a certain channel capacity is allocated to the use of both services according to a semi-fixed principle, and the services use other channels by using a combination of the algorithms of Examples 1 and 2 so that congestion situations with respect to packet radio services will be under control. The base transceiver station 14 transmits via control channels information to the mobile stations 18 so that they can compete for channels, and also that the access into the network by mobile stations 18 using low priority packet radio service could be prevented until more channels are available.

The foregoing examples are not intended to limit or restrict the teaching of this invention, which is instead intended to be given a scope commensurate with the scope of the following claims.

What is claimed is:

1. A method for dynamic division of radio capacity between packet radio service and circuit switched service in a TDMA system in which two-way traffic between base transceiver stations and mobile stations takes place in time slots on predetermined channels, characterized in that:

in a basic mode a base transceiver station reserves a first predetermined number of time slots for packet radio service and a second predetermined number of time slots for circuit-switched service on said predetermined channels, and that on the basis of a predetermined criterion, said base transceiver station allocates at least one additional time slot to one of the packet radio service and circuit switched service, said predetermined criterion comprising any one of the following:

a new packet radio connection is set up; an existing packet radio connection is terminated;

a new packet radio session is set up; an existing packet radio session is terminated;

a handover concerning a certain mobile station is performed; and a certain threshold value is reached in a traffic measurement performed at said base transceiver station.

2. A method according to claim 1, characterized in that said first predetermined number of time slots comprises all the data transmission time slots of at least one of said predetermined channels when circuit switched service does not require capacity, such that no time slot is reserved for circuit switched service on said one predetermined channel, and that at least one time slot is allocated to circuit switched service when said predetermined criterion is fulfilled.

3. A method according to claim 1, characterized in that said first predetermined number of time slots comprises a predetermined minimum number of time slots, and on the basis of said predetermined criterion, one time slot is first allocated to the packet radio service and during the assignment of the subsequent packet the necessary number of additional time slots are allocated.

4. A method according to claim 3, characterized in that said minimum number of time slots is adjusted on the basis of traffic and/or economic factors.

5. A method according to claim 1, characterized in that said predetermined criterion further comprises a request received from a mobile station, the request requesting network capacity for one of packet radio service and circuit switched service.

6. A method according to claim 5, characterized in that said predetermined first number of time slots is zero, and a mobile station, in order to have access to packet radio service capacity, makes a request for said packet radio service capacity to a base transceiver station.

7. A method according to claim 1, characterized in that said predetermined criterion comprises threshold values obtained by traffic measuring occurring at one of said base transceiver stations and that, when the traffic of the service concerned increases to above a predetermined first threshold value at least one additional time slot is allocated to this service and, when the traffic of the service concerned drops to below a predetermined second threshold value, a corresponding number of time slots are deallocated from this service.

8. A method according to claim 7, characterized in that the serivce concerned is packet radio service and that additional time slots are allocated, when necessary, from multiple channels.

9. A method according to claim 7, characterized in that the determination of the threshold values is based on at least one of long-term measurement of traffic behavior, and an adjustment of at least one of the threshold values on the basis of the traffic measurement result over a specified time period.

10. A method according to claim 1, characterized in that the method is applied in parallel to the FDMA bands in said TDMA system such that said FDMA bands are treated like said time slots.

11. A method according to claim 1, characterized in that said predetermined first number of time slots is 0, and that a mobile station in order to have access to packet radio service capacity makes a request for said access to said base transceiver station.

12. A time division multiple access (TDMA) mobile telecommunication system, which comprises a base station system (BSS), comprising base transceiver stations and base station controllers, and mobile stations, and in which two-way traffic between the base transceiver stations and the mobile stations takes place in time slots on predetermined channels, and in which mobile stations there is packet radio service and circuit switched service, characterized in that, for dynamic division of radio capacity between packet radio service and circuit switched service, said system comprises:

means for causing, in the basic mode, the base station system (BSS) to reserve for packet radio service a predetermined first number of time slots, and for circuit switched service a predetermined second number of time slots, means, in the base station system (BSS), for monitoring the capacity required for each service, means for setting a predetermined criterion, said predetermined criterion comprising any one of the following:

a new packet radio connection is set up;

an existing packet radio connection is terminated;

a new packet radio session is set up;

an existing packet radio session is terminated;

a handover concerning a certain mobile station is performed; and a certain threshold value is reached in a traffic measurement performed at said base transceiver station, and means for allocating to one of the packet radio service and circuit switched service, on the basis of said predetermined criterion, at least one additional time slot.

13. A mobile telecommunication system according to claim 12, characterized in that the base station system comprises means for transmiting to at least one of said mobile stations information regarding the division of radio capacity between packet radio service and circuit switched service.

14. A mobile telecommunication system according to claim 12, characterized in that said causing means comprises:

means for setting said first predetermined number of time slots to all the data transmission time slots of at least one of said predetermined channels when circuit switched service does not require capacity, such that no time slot is reserved for circuit switched service on said one predetermined channel; and means for allocating at least one time slot to circuit switched service when said predetermined criterion is fulfilled.

15. A mobile telecommunication system according to claim 12, characterized in that said causing means comprises:

means for setting said first predetermined number of time slots to a predetermined minimum number of time slots; and means, on the basis of said predetermined criterion, for first allocating one time slot to the packet radio service and during the assignment of the subsequent packet allocating the necessary number of additional time slots.

16. A mobile telecommunication system according to claim 15, characterized in that said causing means comprises means for adjusting said minimum number of time slots on the basis of traffic and/or economic factors.

17. A mobile telecommunication system according to claim 12, characterized in that said predetermined criterion set by said means for setting a predetermined criterion further comprise a request is received from a mobile station requesting network capacity for one of packet radio service and circuit switched service.

18. A mobile telecommunication system according to claim 12, characterized in that said predetermined criterion set by said means for setting a predetermined criterion comprises threshold values obtained by traffic measuring occurring at one of said base transceiver stations, and further comprising:

means, when the traffic of the service concerned increases to above a predetermined first threshold value, for allocating at least one additional time slot to this service; and means, when the traffic of the service concerned drops to below a predetermined second threshold value, for deallocating a corresponding number of time slots from this service.

19. A mobile telecommunication system according to claim 18, characterized in that the service concerned is packet radio service and further comprising means for allocating additional time slots, when necessary, from multiple channels.

20. A mobile telecommunication system according to claim 12, characterized in that said means for allocating comprises means for applying said mobile telecommunication system in a TDMA system and in parallel to the FDMA bands in said TDMA system such that said FDMA bands are treated like said time slots.

* * * * *